(12) United States Patent
Berestovetsky et al.

(10) Patent No.: US 11,095,658 B2
(45) Date of Patent: Aug. 17, 2021

(54) ENHANCED SYSTEM ACCESS CONTROLS

(71) Applicant: JPMorgan Chase Bank, N.A., New York, NY (US)

(72) Inventors: Dimitry Berestovetsky, New York, NY (US); Thomas Musella, New York, NY (US); Felix Glazer, New York, NY (US); Chris Sookchand, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 266 days.

(21) Appl. No.: 16/239,068

(22) Filed: Jan. 3, 2019

(65) Prior Publication Data
US 2020/0220879 A1 Jul. 9, 2020

(51) Int. Cl.
*H04L 29/06* (2006.01)
(52) U.S. Cl.
CPC .......... *H04L 63/105* (2013.01); *H04L 63/102* (2013.01); *H04L 63/20* (2013.01)
(58) Field of Classification Search
CPC ..... G06F 16/00; H04L 63/083; H04L 63/102; H04L 63/104; H04L 63/105; H04L 63/20
See application file for complete search history.

(56) References Cited

U.S. PATENT DOCUMENTS

| | | | |
|---|---|---|---|
| 2006/0074915 A1* | 4/2006 | Bhandarkar | G06F 3/048 |
| 2009/0300747 A1* | 12/2009 | Ahn | H04L 63/0876 |
| | | | 726/9 |
| 2011/0307957 A1* | 12/2011 | Barcelo | G06F 21/552 |
| | | | 726/25 |
| 2019/0230088 A1* | 7/2019 | Rice | G06F 21/6218 |
| 2020/0169565 A1* | 5/2020 | Badawy | H04L 63/105 |

OTHER PUBLICATIONS

Chari, Suresh, et al. "Ensuring continuous compliance through reconciling policy with usage." Proceedings of the 18th ACM symposium on Access control models and technologies. 2013. (Year: 2013).*

* cited by examiner

*Primary Examiner* — Joseph P Hirl
*Assistant Examiner* — Ka Shan Choy
(74) *Attorney, Agent, or Firm* — Greenblum & Bernstein, P.L.C.

(57) ABSTRACT

A system for and method of reconciling access data from a plurality of organizational systems with that of data comprising access rights of members of that organization. The system and method provide a means for identifying inconsistencies between the data representing actual access and that of data representing granted access rights which should be in place for various past and present users. Identified inconsistencies are reported to parties responsible for compliance with organizational and regulatory rules so that those parties can investigate and correct errors before they result in failure to meet service level or regulatory requirements.

20 Claims, 24 Drawing Sheets

ENHANCED SYSTEM ACCESS CONTROLS

TECHNICAL FIELD

The present invention relates generally to methods of and systems for managing user access to computer systems.

BACKGROUND

As a result of an increasingly digital world, businesses and other organizations must store and access increasingly large amounts of data. Some of this data may be confidential in nature and the target of various forms of unauthorized access or breach. Exposing this data to unauthorized access could result in harm to the business or the public. As the result of past financial crises in the United States, various laws and regulations were enacted to regulate businesses with regard to their responsibility to protect confidential information from unauthorized disclosure that could result in harm to investors. Particularly, these regulations include the Public Company Accounting Reform and Investor Protection Act of 2002 (commonly known as The Sarbanes-Oxley Act of 2002 or "SOX"). Among the many requirements imposed by SOX, are provisions that require organizations to track and control access to sensitive systems and information.

With the increasing number of computer systems and associated software applications utilized by businesses comes an increase in the number of users whose access must be monitored and controlled. A large business could have thousands of applications, each with various levels of access rights applicable to users or groups of users. In addition to the number of access rights that must be tracked and controlled, the access requirements of users must also be tracked and controlled. In some cases, the number of users could be in the tens of thousands. In order to accommodate changing business needs as well as employee turnover within the business, the levels of access required by these users can change rapidly and repeatedly. The number of users, number of applications, and potential frequency at which appropriate levels of access can change, tracking and controlling access to sensitive information can be a significant undertaking.

Therefore a need exists for systems and methods capable of tracking, controlling, and modifying access requirements for large numbers of users within an organization responsible for the control of sensitive information. Furthermore, a need exists for such systems and methods to enable organizational compliance with laws and regulations concerning the handling of sensitive or confidential information.

SUMMARY

Methods and systems for tracking, controlling, and modifying data access rights for a plurality of users of a plurality of software applications are disclosed herein. Exemplary embodiments may comprise, at the highest level, a method and system that receives employee data with regard to roles and employment status, determines access requirements of each employee in view of the employee data, and verifies that those access requirements are reflected by the data that represents actual user access. Exemplary embodiments can further include certification completeness controls, file and data feed monitoring, revocation aging monitoring and reporting, on-boarding completeness monitoring, and off-boarding completeness monitoring.

In one exemplary embodiment, a source system is configured to host source system files that can be uploaded into a global identity and access management ("GIAM") system. The GIAM can receive employee status and role information and determine what access level an employee requires. This information may then be used to generate service requests to modify the employee's access as required. In some embodiments, the GIAM is configured to receive regular updates of source system files which may be used to derive a Golden Access Count ("GAC"). The GAC is used in conjunction with the regularly updated source system files to ensure feed access data completeness in the GIAM, and to detect rejects, exclusions, and other errors. In an exemplary embodiment, these rejects, exclusions, and other errors can be monitored in order to determine compliance to regulatory and service level commitments.

In an exemplary embodiment, detected rejects, exclusions, and errors are configured to be displayed on a dashboard. The dashboard may generate and display visualizations of the rejects, exclusions, and errors to facilitate and improve review and response of the detected errors to avoid non-compliance with regulatory requirements or business-driven service level agreements ("SLAs"). The dashboard may be further configured to display data feed parameters including completeness and exclusions. Some embodiments may display data regarding service level compliance with access revocation and modification requirements.

In another exemplary embodiment, a system for confirming compliance is provided. The system comprises: a plurality of servers, comprising at least a first server, a second server, and a third server; a display; and software instructions that, when executed cause the first server to obtain a first data, said first data defining access entitlements of a first user to a first system; obtain a second data defining access entitlements of a second user to the first system, obtain a third data defining access entitlements of the first user to a second system, and obtain a fourth data defining access entitlements of the second user to the second system; cause the second server to obtain a fifth data from the third server, the fifth data relating to status of a third user of a third system, wherein the third user is one of the first user and the second user; and wherein the third system is one of the first system and the second system, determine if an expected set of access entitlements associated with the fifth data matches the actual access entitlement of the third user for the third system; and present the results of the determination on the display.

In certain exemplary embodiments, the first server, the second server, the third server, and the fourth server may comprise one or a series of connected servers. In certain exemplary embodiments, the first and second users are employees of the same company. In certain exemplary embodiments, the company associated with the first and second users may be a bank or other financial institution. In other exemplary embodiments, the software instructions can be performed on servers other than the first and second servers.

The above and other aspects and advantages of the general concepts disclosed herein will become more readily apparent from the following description and figures, illustrating by way of example the principles of the disclosed general concepts.

BRIEF DESCRIPTION OF THE DRAWINGS

These and other features of the disclosure will become better understood with regard to the following description and accompanying drawings in which.

DETAILED DESCRIPTION

Large organizations often have hundreds, if not thousands, of employees. Each of these employees has certain levels of access to the organization's electronic resources. These resources often have sensitive, valuable, or confidential data. Accordingly, each employee generally has a level of access that is appropriate to their role in the organization. In order to reduce the risk that the information contained in the organization's electronic resources is improperly accessed and/or disclosed, data access levels are adjusted according to an employee's role and employment status. Frequently these adjustments are mandated by rules and regulations applicable to the organization. These rules and regulations may require verification and reporting to establish organizational compliance. Exemplary embodiments receive input data that represents employee roles, employee status, resource access configurations, and allowed access levels according the applicable rules and regulations.

Figure 1:
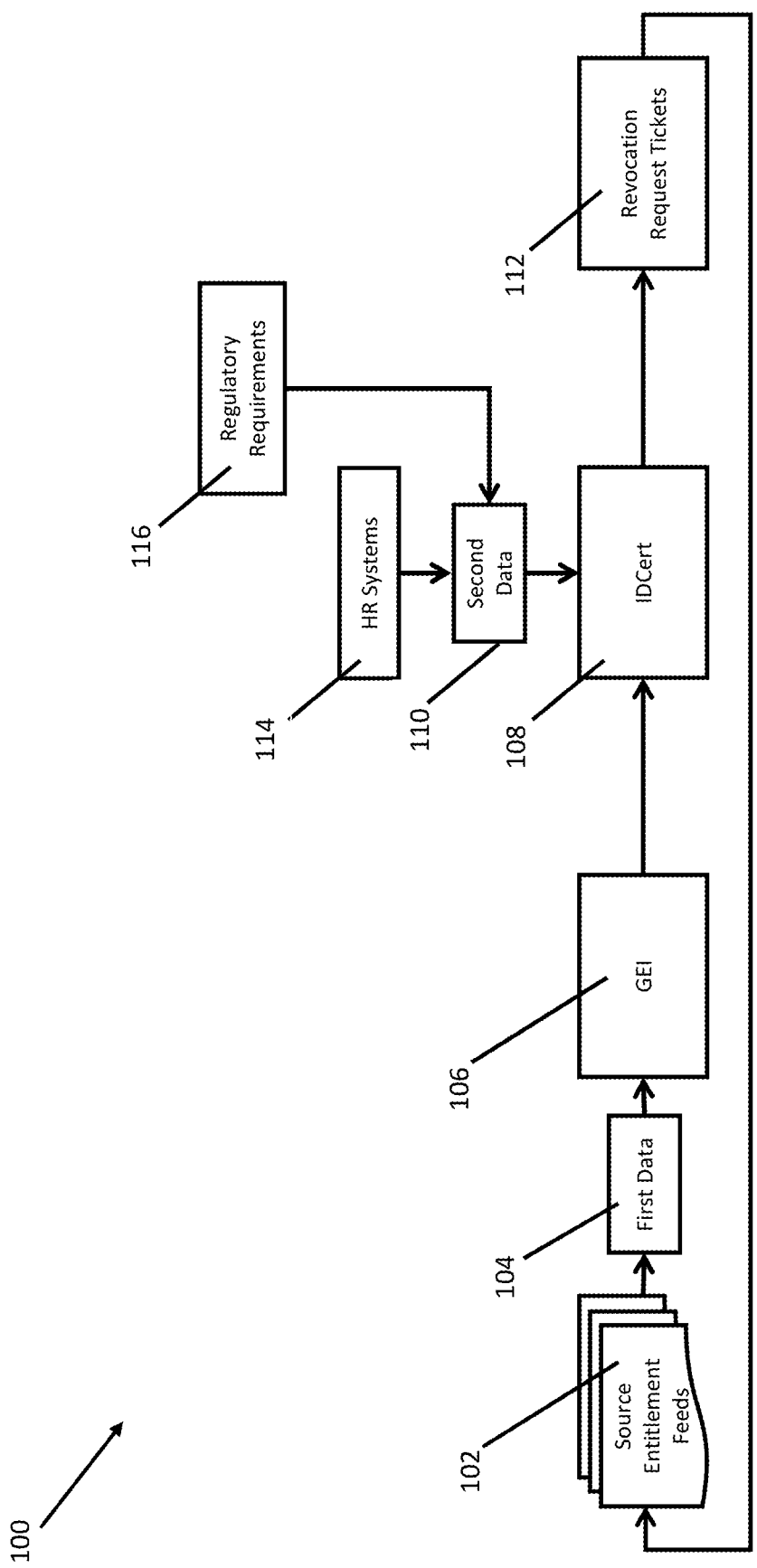
FIG. 1 is a flow diagram illustrating a data source and various processing system components that make up an exemplary global identity and access management system.

As shown in FIG. 1, an exemplary GIAM system 100 is shown. The GIAM 100 is in communication with a plurality of sources 102 which may be organized as a plurality of source entitlement feeds. The entitlement feeds can be associated with user data, such as job roles or employment status which can further define a level of user access to various systems within an organization. The user data may be obtained by a source entitlement feed from a particular source or source system, for example, data associated with an enterprise password vault (EPV) or similar data repository. Generally, the data associated with sources 102 relates to user information but may also comprise data related to business resources or compliance information. However, it will be appreciated that sources 102 and any associated entitlement feeds may be configured to transmit, store, or receive any type of electronic data useful to an organization. In some embodiments, source entitlement feeds are operable to send and receive data to and from other entitlement feeds to create an aggregated entitlement feed. Accordingly, it will be appreciated that sources 102 may comprise a plurality of source entitlement feeds operable to organize and transmit data received from other sources, databases, or data repositories into a dataset or collection of datasets.

In one embodiment, sources 102 are configured to construct or provide a first data 104. In certain embodiments, GIAM 100 is configured to organize the data from sources 102 into the first data 104. Sources 102 may provide the first data 104 as a data set or collection of datasets. In some embodiments, the first data 104 comprises entitlement information related to employee access levels. The first data 104 may be transmitted to a global entitlement inventory ("GEI") 106. In some embodiments, GEI 106 may be a database configured to host access control data. The GEI 106 may be in communication with other data sources within an organization, and may be configured to receive and store data from these sources. In some embodiments, the GEI 106 is configured to modify first data 104 according to access control data stored at the GEI 106.

From the GEI 106, the first data 104 may be transmitted to an entitlement management and certification service ("IDCert") 108. IDCert 108 may be configured to communicate with data sources inside the organization such as HR systems database 114 and regulatory requirements database 116. HR systems database 114 may be any database or data repository configured to receive and/or store employment and role status for users within an organization. HR systems database 114 may be further configured to update employment and role status information in near real-time. Regulatory requirements database 116 may be any database or data repository configured to receive and/or store compliance information related to regulatory standards, such as SOX or the like. In some embodiments, HR systems database 114 and regulatory requirements database 116 may be configured to generate or construct a second data 110. Second data 110 may be representative of data from one or both of HR systems database 114 and regulatory requirements database 116. After receiving the first data 104 and second data 110, IDCert 108 may be configured to process user data with employment or compliance data within the first data 104 and the second data 110 and determine an appropriate access for a user or group of users. IDCert 108 may then be configured to generate revocation request tickets 112 to either revise or revoke access for a user or group of users. In some embodiments, the GIAM 100 may provide enhanced access controls integrated with a revocation request and operate as an automated access provisioning system. The GIAM 100 may be further configured to standardize the data within the system and centrally store the data to enable later validation and compliance verification. GIAM 100 enables reconciliation of user data with employment and compliance data within the system ensuring that access rights are aligned with employment and role entitlements in a limited amount of time. The GEI 106 and IDCert 108 can both be formed from computer servers that are capable of acting as a database or an entitlement management service within GIAM 100 but also can execute software instructions to perform further functions such as calculations and decision making related to the data stored or hosted therein. It will be appreciated that the various components of GIAM 100 may be implemented in a single server system or in a plurality of distributed server systems communicating over a network, e.g. Internet or intranet network. Further, the computer systems used to host and/or implement the GIAM 100 and its various components comprise at least a processor in communication with a memory capable of storing instructions, such that when the instructions are executed by the processor, the functions and features of the GIAM are performed. Those of skill in the art will appreciate that various computer hardware configurations may be used to implement and execute the methods and systems as disclosed herein.

Figure 2:
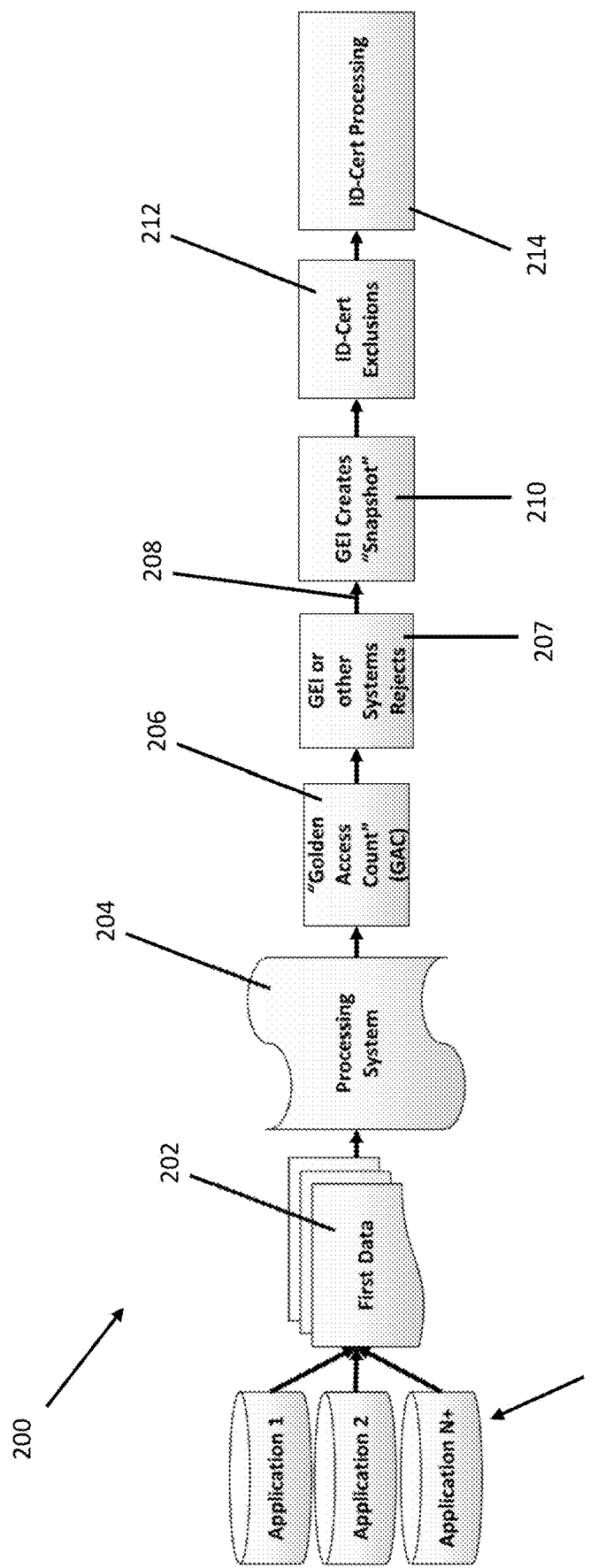
FIG. 2 is a flow diagram illustrating flow of data and processing steps according to an exemplary embodiment.

FIG. 2 shows a diagram of an exemplary embodiment of a data feed and monitoring completeness process 200 within a GIAM such as GIAM 100. The process 200 may begin with a plurality of sources 201 which can obtain or receive data from a plurality of systems or applications. In some embodiments, the process 200 may perform a completeness verification to ensure that there is no data loss or corruption between the sources 201 and the first data 202. The data from these systems or applications may be organized into a first data 202 by the GIAM or by the sources 102. In certain embodiments, an intermediary system is used to generate or construct the first data 202 from the data provided by sources 201. In some embodiments, the process 200 may perform a completeness verification to ensure that there is no data lost between the sources 201 and the first data 202. The first data 202 may comprise source system files or proprietary data related to an organization. However, it will be appreciated that first data 202 may comprise any user or system information useful to the organization. In some embodiments, a processing system 204 is operable to generate a computer executable script which may pull the first data 202 from the sources 201. In other embodiments, the first data 202 can be pushed (i.e. transmitted by the sources 201 without a request from the processing system 204). In some embodiments, the processing system 204 may be able to both push and pull data. Certain data types within first data 202 may require an intermediary system to collect, reformat, or otherwise process the data types into a format usable by the processing system 204. For example, an intermediate system such as a gateway system could be used as a dedicated system to process certain data types and modify the first data 202, for example, into a single compatible data format, for processing at the processing system 204. In some embodiments, processing system 204 is configured to perform completeness verification to ensure that the data from sources 201 or first data 202 is complete and not corrupted. In some embodiments, processing system 204 is configured to update or modify the first data 202.

After the first data 202 has been processed by the processing system 204, the data may be used to derive a Golden Access Count ("GAC") 206. The GAC 206 may receive and store information relating to the first data 202, such as file names, locations, file size, etc. Additionally, the GAC 206 may be configured to generate a global count relating to the number of files in the first data 202 or other data sets received from sources 201. In some embodiments, the GAC may be used in conjunction with the first data 202 to ensure feed access data completeness in the GIAM and to detect rejects, exclusions, and other errors within the first data 202. In certain embodiments, the GAC 206 can receive updated data directly from sources 201. It will be appreciated that updated data may comprise information supplemental to the first data 202, information to modify the first data 202, or new information operable to modify or replace the first data 202.

The GAC 206 may be further configured to pass the first data 202 or any modified data related to the first data to a global entitlement inventory system ("GEI") 207. The GEI 207 may be configured to generate access control data and determine the nature and extent of any rejected data 208 of the first data 202. Data may be rejected based on inconsistencies with user access or information. Data may also be rejected based on errors related to the data, such as an incompatible format. Rejected data may be removed from the first data 202 or may be tagged as rejected data. In some embodiments, the GEI 207 may be configured to generate historical data relating to the processing of the first data 202. GEI 207 may be further configured to create a snapshot 210 of the first data 202. Snapshot 210 may include information relating to the various modifications and updates related to the first data 202. Snapshot 210 may encompass user access or entitlements at this stage of the process 200 in order to compare and verify user access at the end of the process, after modification to user access is completed. After the snapshot 210 has been generated, the first data 202 may be processed by an entitlement management and certification service ("IDCert") 212. IDCert 212 may be configured to determine exclusions related to the first data 202. Exclusions may comprise data related to users or groups of users whose access has been modified and no longer up to date. In some embodiments, exclusions may exclude users or groups of users that have been transferred or terminated from the organization or business unit. Exclusion data may be removed from the first data 202 or may be flagged as data to exclude in future processing. In certain embodiments, a new dataset, separate from the first data 202, comprising the exclusion data is generated. IDCert 212 may then provide the exclusion data for further processing by IDCert as indicated at 214. Such additional processing may include data verification certification steps. In some embodiments the additional processing 214 includes comparing the exclusion data with snapshot 210.

Figure 3:
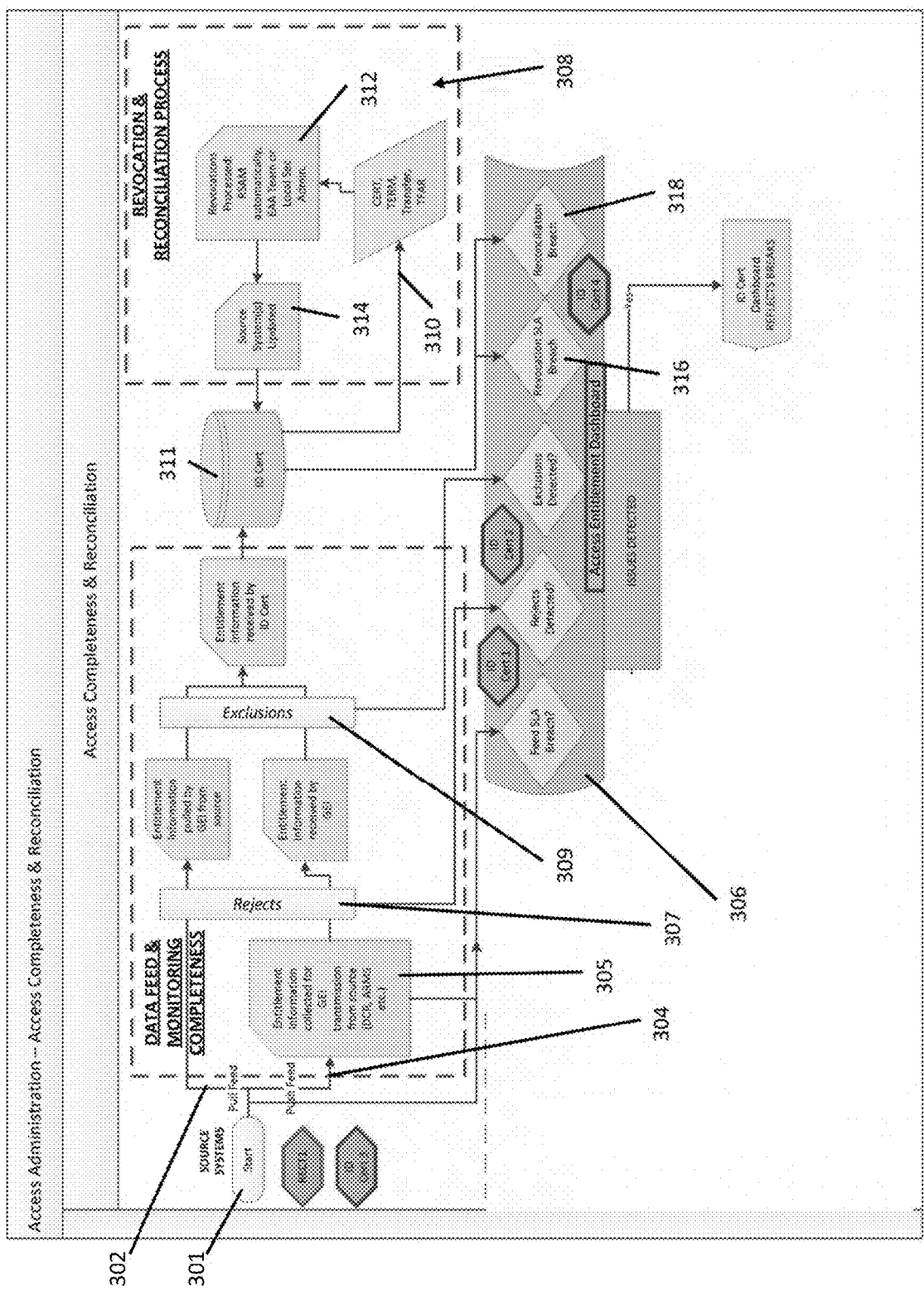
FIG. 3 is a system diagram illustrating flow of data from the data feed and reconciliation process portions of an exemplary embodiment.

As shown in FIG. 3, and with continued reference to FIGS. 1 and 2, a plurality of applications which represent sources 301 (e.g., the sources 102), provide data files (pull feed data 302 and push feed data 304) to a script or process for entry into the GEI 305. A script or process (depending upon the receiving system) is used to load the data files into the GEI 305. The GEI 305 may then process the data files to establish an access count and capture reject data 307. Exclusion data 309 may be derived from the data files. This information is provided to an access entitlement dashboard 306. In addition to the system reject data 307 and the exclusion data 309, the access entitlement dashboard 306 may also receive data that provides a feed breach alert in the event of a breach in the data files or associated data feeds. In an exemplary embodiment, this feed breach alert is the result of a failure of one or both of the data feeds (e.g. pull feed data 302 and push feed data 304) providing data files from the source system 301. System reject data 307 may represent attempts to access a source system 301 where the attempts to access the source system 301 were unsuccessful as the result of improper or unauthorized access credentials. Improper or unauthorized access credentials will result in a rejection of the user attempting to log into the source system 301. In addition to display at the dashboard, system reject data 307 may be provided to the organization or business unit responsible for the system experiencing an unauthorized access attempt.

In addition to system reject data 307, the dashboard presents exclusion data 309. Exclusion data 309 may represent attempts by a user to access a source 301 where the user has valid credentials generally but whose credentials don't allow access to the particular source system 301. In other words, a user known to the organization may have attempted to access a system to which that user does not have access. In certain embodiments, this information is provided to the access entitlement dashboard 306 so that an administrator or other personnel can identify exclusions 309 and research the reason why access is being restricted.

As illustrated by FIG. 3, some embodiments may comprise a revocation and reconciliation process 308. Exclusions 309 may be transmitted to the entitlement management service ("IDCert") 311. IDCert 311 may then be configured to transmit the exclusions 309 to the revocation and reconciliation process 308 at step 310. As shown, source system exclusions 309 are processed by the revocation and reconciliation process at step 312 and the processed data is used to update source systems comprising access information at 314. IDCert 311 may be configured to compare the entitlement information received from the source systems (e.g. exclusions 309) which represents the actual source system access state, to the updated data from step 314. IDCert 311 may comprise information pertaining to revocation and reconciliation requirements that may be imposed by regulatory agencies and/or the organization which is responsible for the various sources 301. If the comparison performed by IDCert 314 reveals that there are differences in the data, these differences are tested to see if they meet the revocation and reconciliation requirements imposed by IDCert 314. In some embodiments, access revocations should be processed within 14 calendar days. In other embodiments, reporting of access revocation may vary according to the level or user access. For other detected exceptions (i.e., rejects, exclusions, and reconciliation errors) there may be weekly reporting, 30-day escalation and at 60 days a break will be created to address the concern. A reconciliation test may be performed, wherein the test involves receiving a file feed that lists user access and comparing that list with a list of access rights to be removed. The test can then validate that the access requirements have been removed. If the test reveals that the requirements have not been met, an alert is provided on the access entitlement dashboard 306 indicating a revocation service level agreement breach 316 or a reconciliation breach 318.

Figure 4:
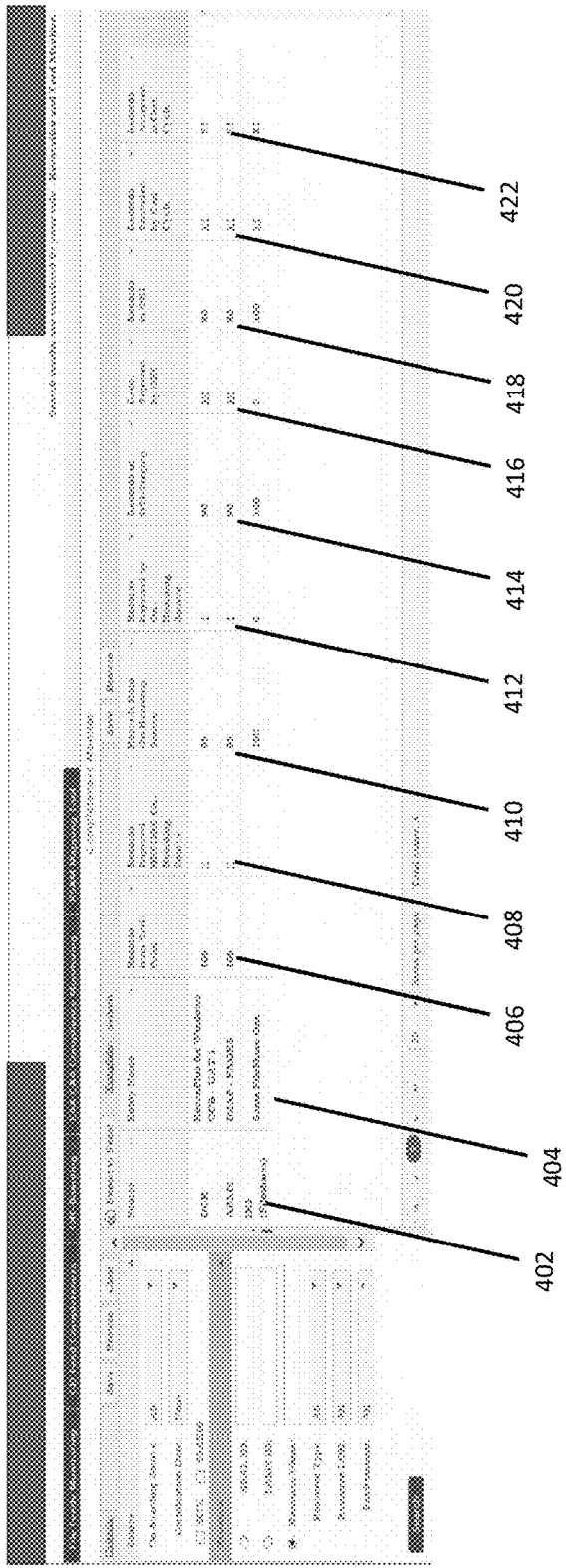
FIG. 4 is an illustration of a user interface displaying a completeness monitor dashboard according to an exemplary embodiment.

FIG. 4 shows an exemplary embodiment of the completeness monitor 400 portion of the access entitlement dashboard (e.g., the access entitlement dashboard 306). An identification of sources (e.g., the sources 102) is shown at 402 while an entity name is displayed at 404. The number of records received is displayed in the column at 406. In the exemplary embodiment shown, there are 5 rejected records at 408 before the onboarding for each source. The next column displays the remaining records from the onboarding source at 410. Remaining records may be expressed as the number of initial records or files minus the records or files rejected (e.g. Records−Rejects=Remaining Records). The number of records rejected by the onboarding source is shown at 412. As illustrated, the next column in the completeness monitor 400 portion of the access entitlement dashboard displays the records in the GEI 106 staging location at 414. The records rejected by the GEI 106 are displayed at 416. The resulting records in the GEI 106 are displayed in the next column 418. The number of records excluded from this provision are displayed in the completeness monitor 400 of FIG. 4 at 420. The resulting records accepted in the entitlement management service are shown at 422. Thus, an observer of the completeness monitor portion 400 of the access entitlement dashboard will recognize that, from the original 100 records received from the source, the number of records that have been accepted by the entitlement management service (IDCert 108) is 65. A user thus can easily identify not only the number of records missing from the entitlement management service 108, but also at what stage those records failed to transfer throughout the data feed and monitoring completeness process 200.

Figure 5:
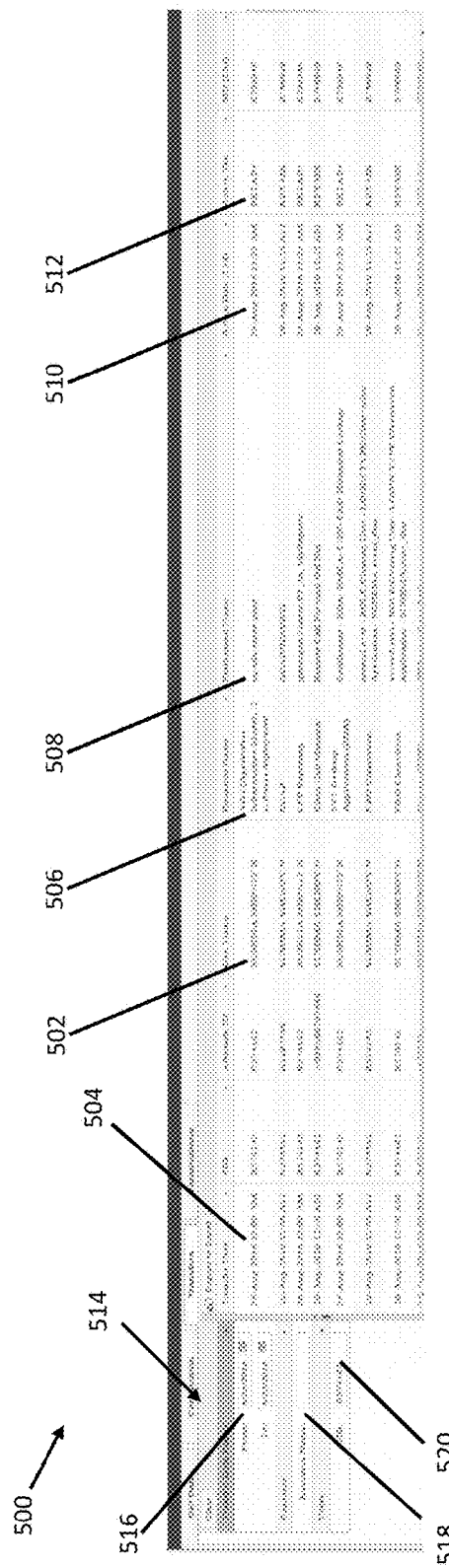
FIG. 5 is an illustration of a user interface displaying an entitlement viewer according to an exemplary embodiment.

In some embodiments, the GIAM may be configured to display information related to individual employees. As shown in FIG. 5, an exemplary embodiment of an access control database entitlement viewer 500 includes access data related to a particular user 502. Transfer date 504 of a particular entitlement 506, the entitlement name 508, an action taken date 510, the action taken 512 with regard to the user identified. In addition, as is shown in the portion of the access control database entitlement viewer 500 at 514, a filter may be provided to allow a user to limit the entitlements displayed to a particular date range 516, user 518, or ID 520. In an exemplary embodiment, a completeness monitoring function provides a means to reconcile the desired state of access with that of the actual state in light of regulatory and other requirements.

Figure 6:
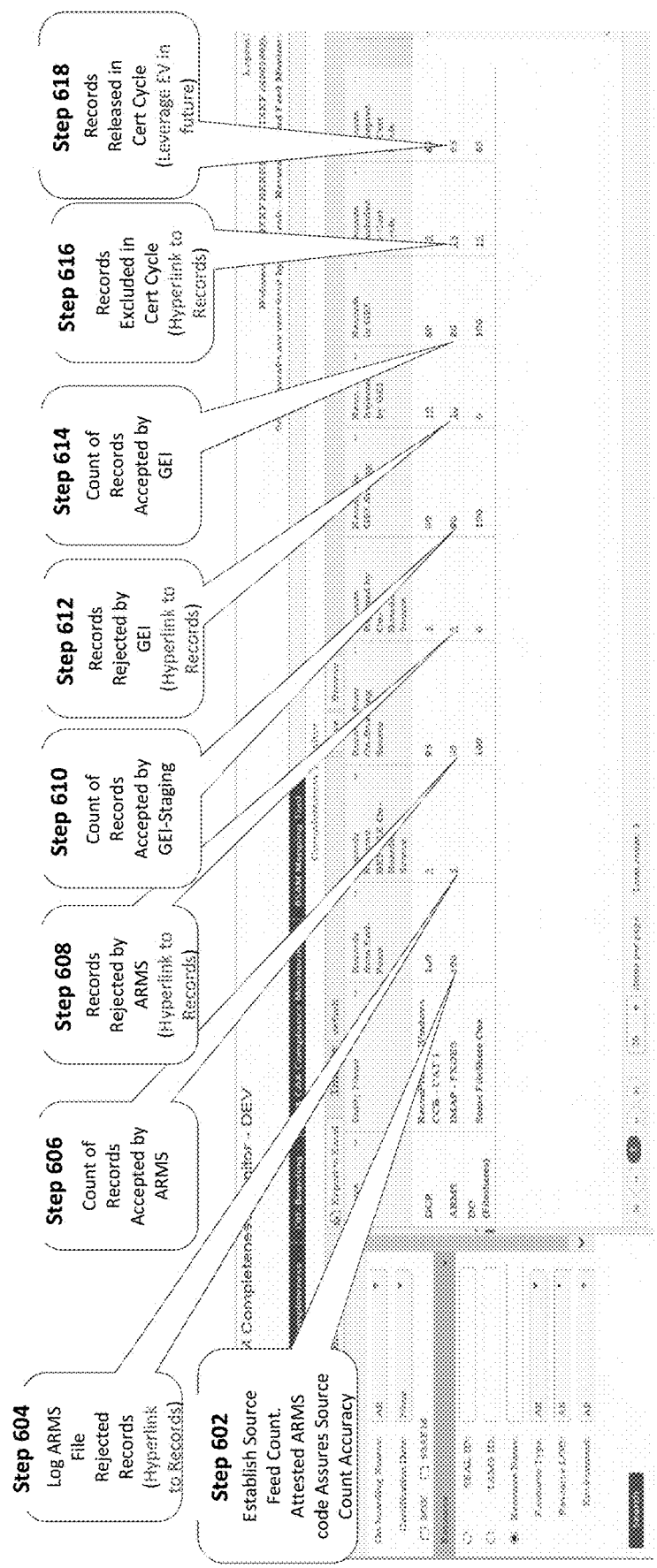
FIG. 6 is an illustration of a user interface displaying a completeness monitor dashboard with process steps for determining record data status for a specific system file source according to an exemplary embodiment.

FIG. 6 illustrates the steps taken to determine the various data points illustrated in an access control database entitlement viewer 600 (e.g., access control database entitlement viewer 500) for a particular source (in this example, ARMS). Step 602 includes establishing a source feed count. In some embodiments, code attestation may be performed for the particular source to verify the accuracy of the source feed count. At step 604, a log file of rejected records is created. A step 606, a count of records accepted by the source is determined. Step 608 determines the number of records rejected by the source. The number of records accepted by an access control database (e.g. GEI) staging location is calculated in step 610. These records are presented to the GEI 106 and the resulting rejections are calculated in step 612. The count of accepted records is calculated in step 614. Step 616 identifies records excluded by the IDCert 108 process. The records released by the IDCert 108 process are calculated in step 618. The calculated exceptions and exclusions may then be escalated to support infrastructure so as to reduce the likelihood that a service agreement or regulatory requirement will not be satisfied. In some embodiments, the access control database entitlement viewer 600 is configured to hyperlink to records at steps 604, 608, 612, 616, and 618.

Figure 7:
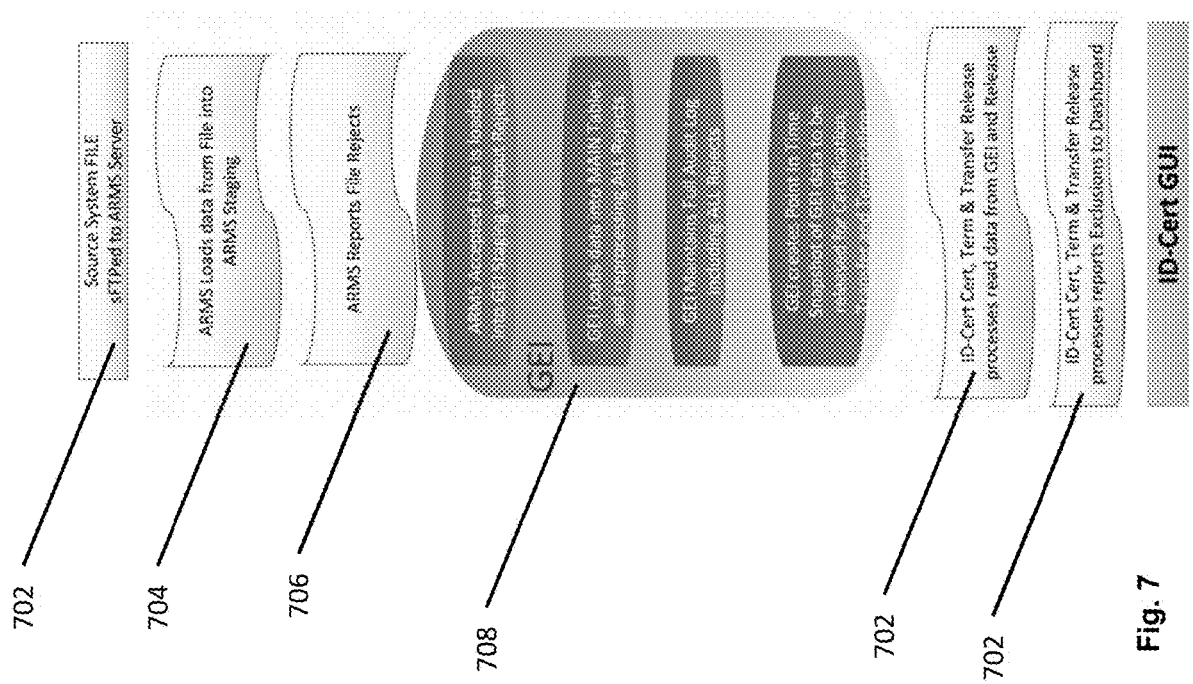
FIG. 7 is a flow diagram of steps taken to process system file data from a specific system file source according to an exemplary embodiment.

The flow diagram of FIG. 7 illustrates the process of FIG. 6 in a series of steps that start with the transfer of first data 202 in step 702, through the reporting of exclusions to the access entitlement dashboard 306. Step 704 represents the step of loading data into a data staging area. Step 706 is the step of reporting system reject data 208. Step 708 represents loading the data into the database 106, entering information pertaining to a particular set of data into an audit log, and creating a snapshot of the data to be released for further processing. Step 710 represents the processing of data by the IDCert 108, and step 712 represents the process of reporting the resulting exclusions 210 to the access entitlement dashboard 306. In some embodiments, automated completeness monitoring may be implemented through daily monitoring of the process and verification of the various counts related to source files, rejected files, and excluded files. Counts may be verified to determine that no data loss has occurred or that files marked for rejection or exclusion were properly rejected or excluded. In certain situations, if verification determines an abnormality in the counts, a support ticket may be generated to alert the organization or business unit responsible for the GIAM that a data abnormality has been detected. In further aspects of the GIAM, and audit package may be created for the release of a certification or transfer process. The entitlement dashboard may retrieve data related to actions taken and include snapshot data related to the source, rejects, and exclusion counts.

Figure 8:
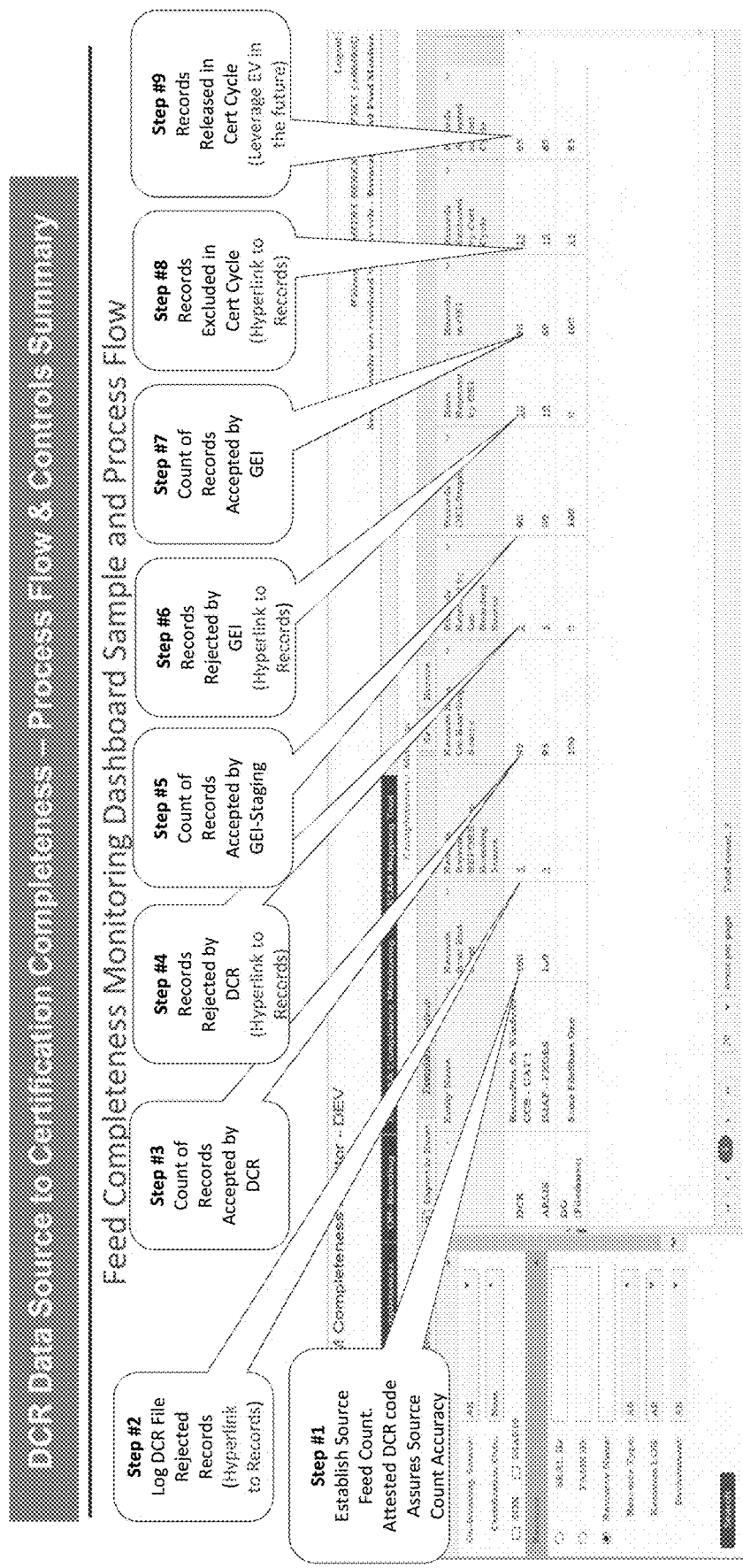
FIGS. 8, 10, 12, 14, 16, 18, 20, 22, and 24 are illustrations of user interfaces displaying a completeness monitor dashboard with process steps for various specific system data sources according to exemplary embodiments.
Figure 9:
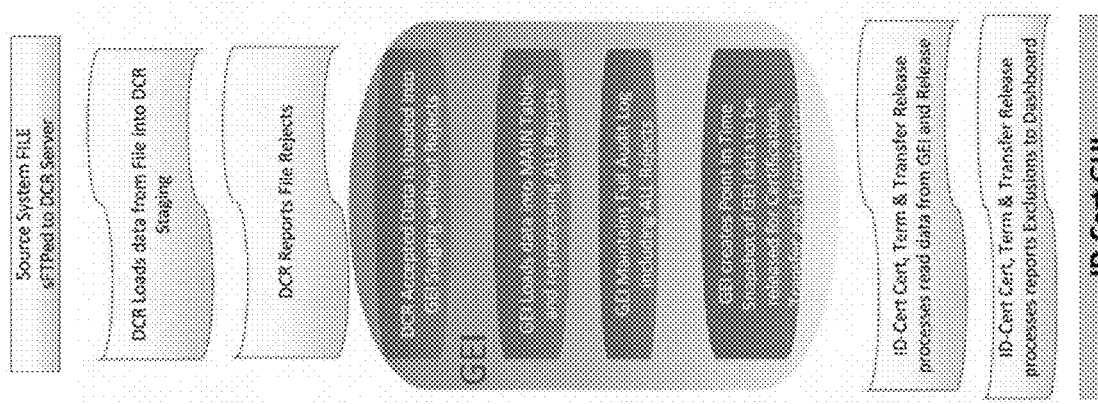
FIGS. 9, 11, 13, 15, 17, 19, 21, 23, and 25 are illustrations of flow diagrams of steps taken to process system file data from various specific system file sources according to exemplary embodiments.
Figure 10:
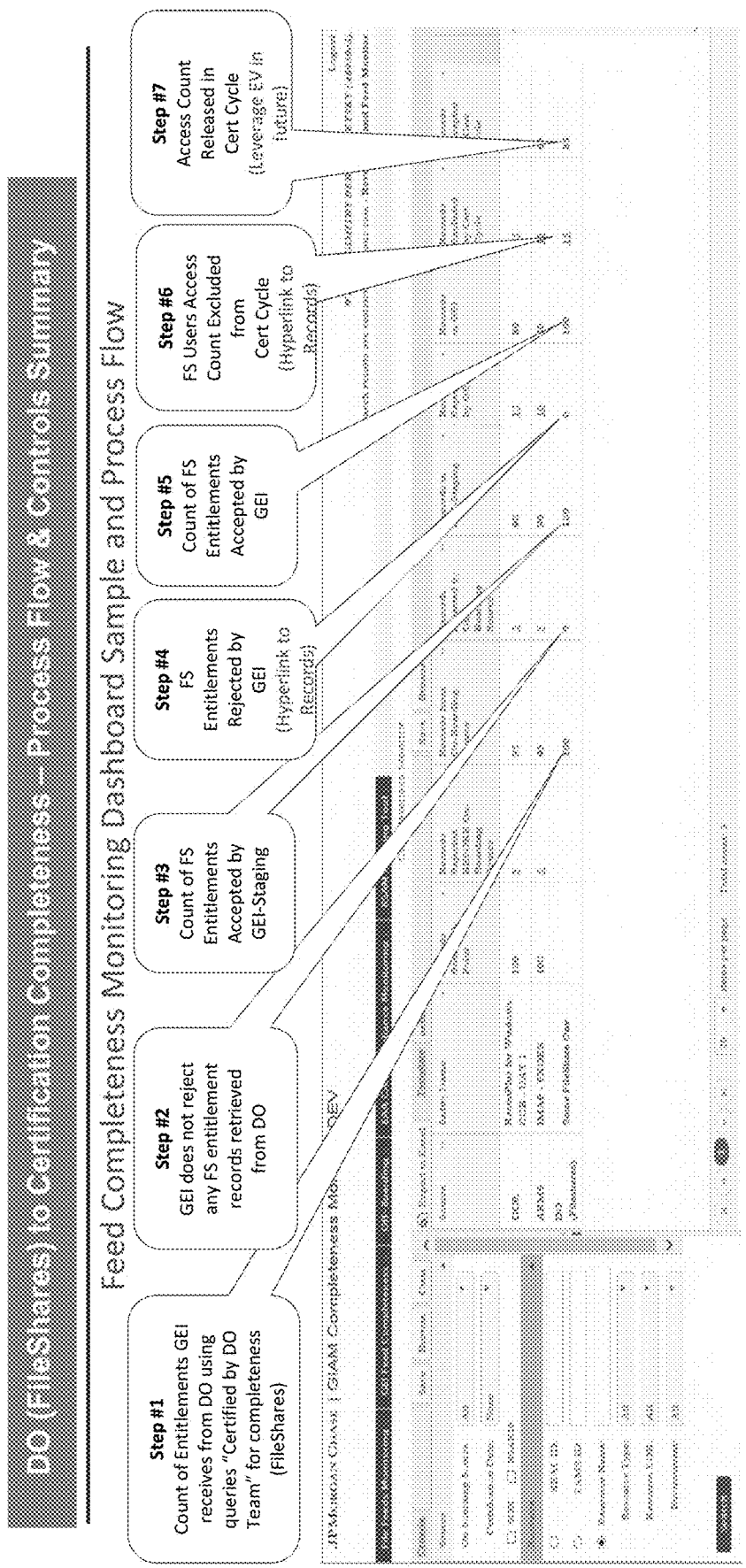
Figure 11:
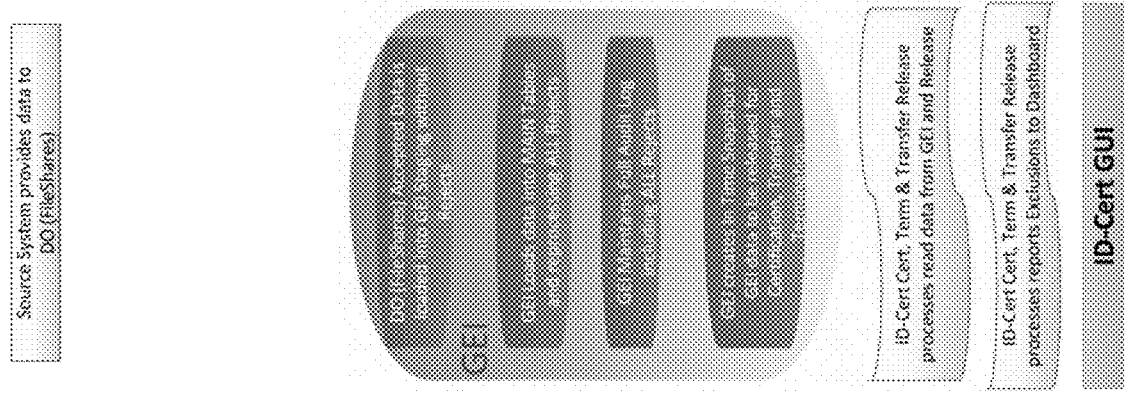
Figure 12:
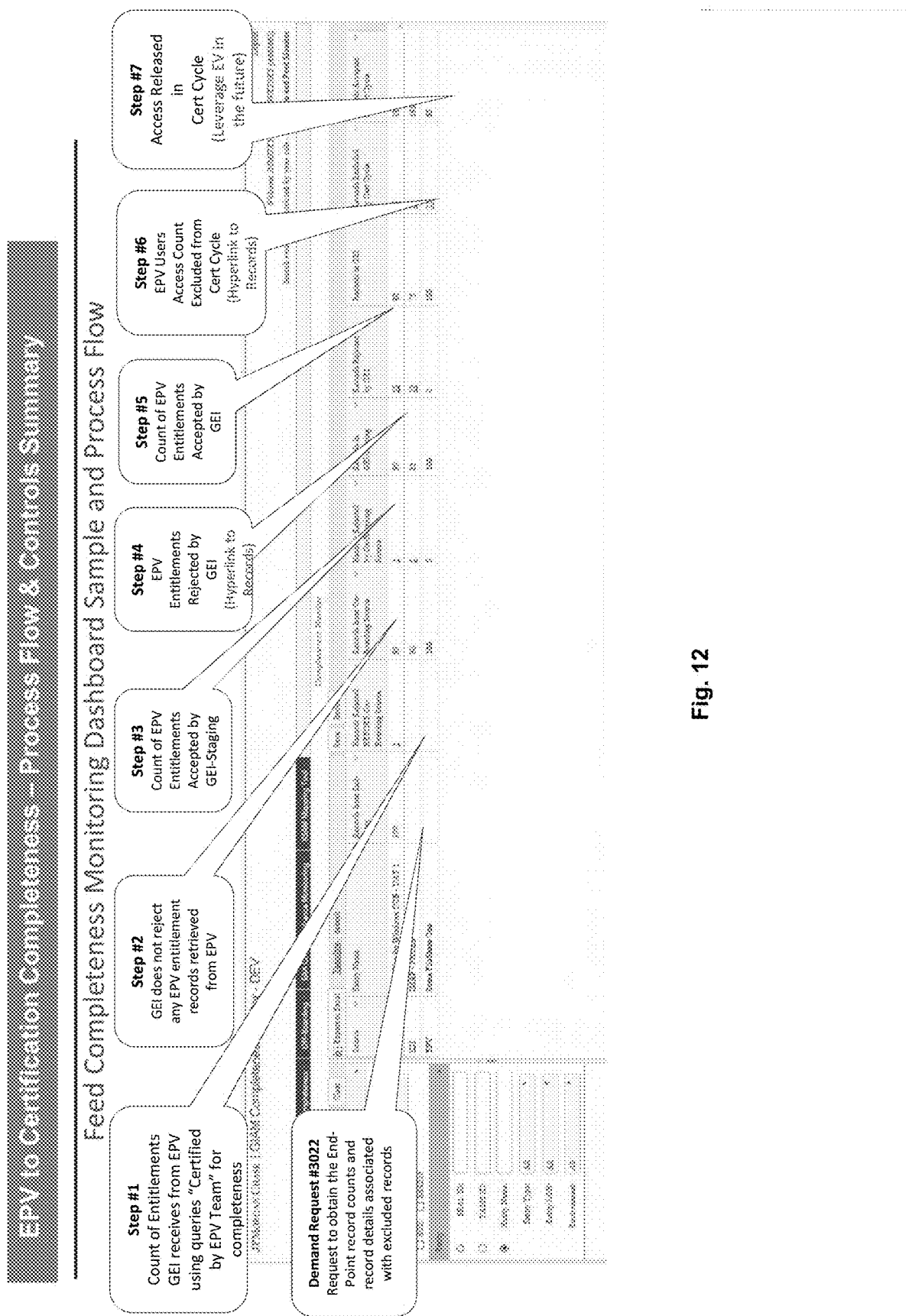
Figure 13:
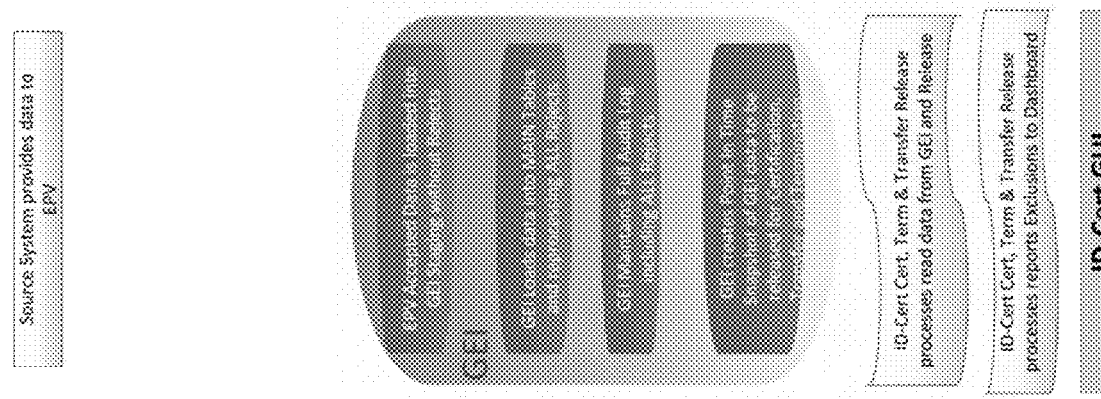
Figure 14:
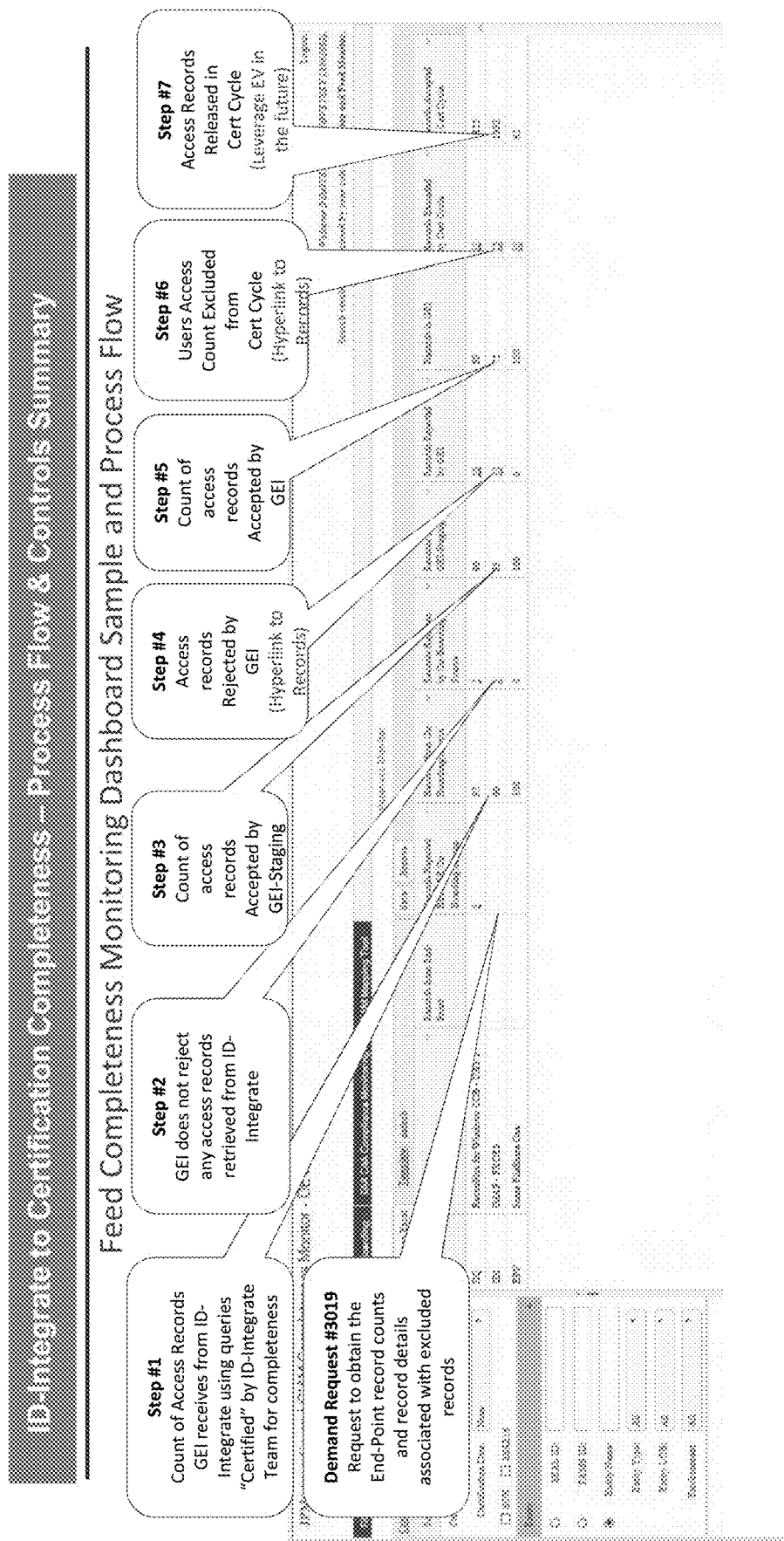
Figure 15:
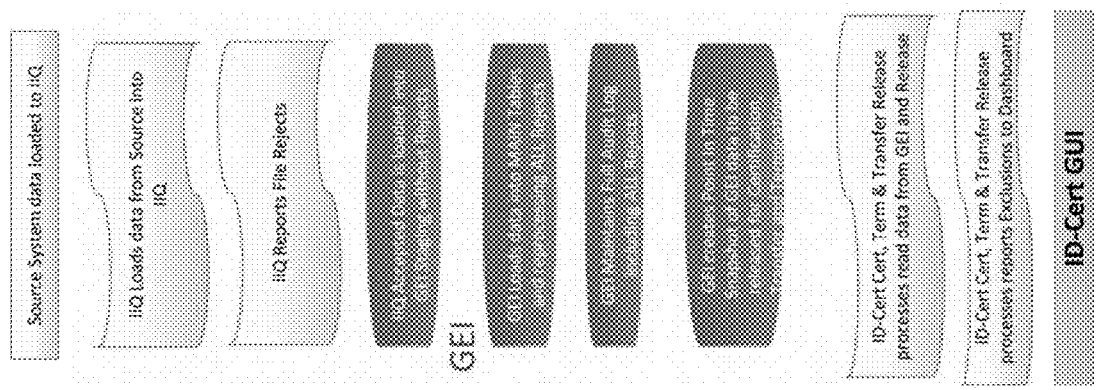
Figure 16:
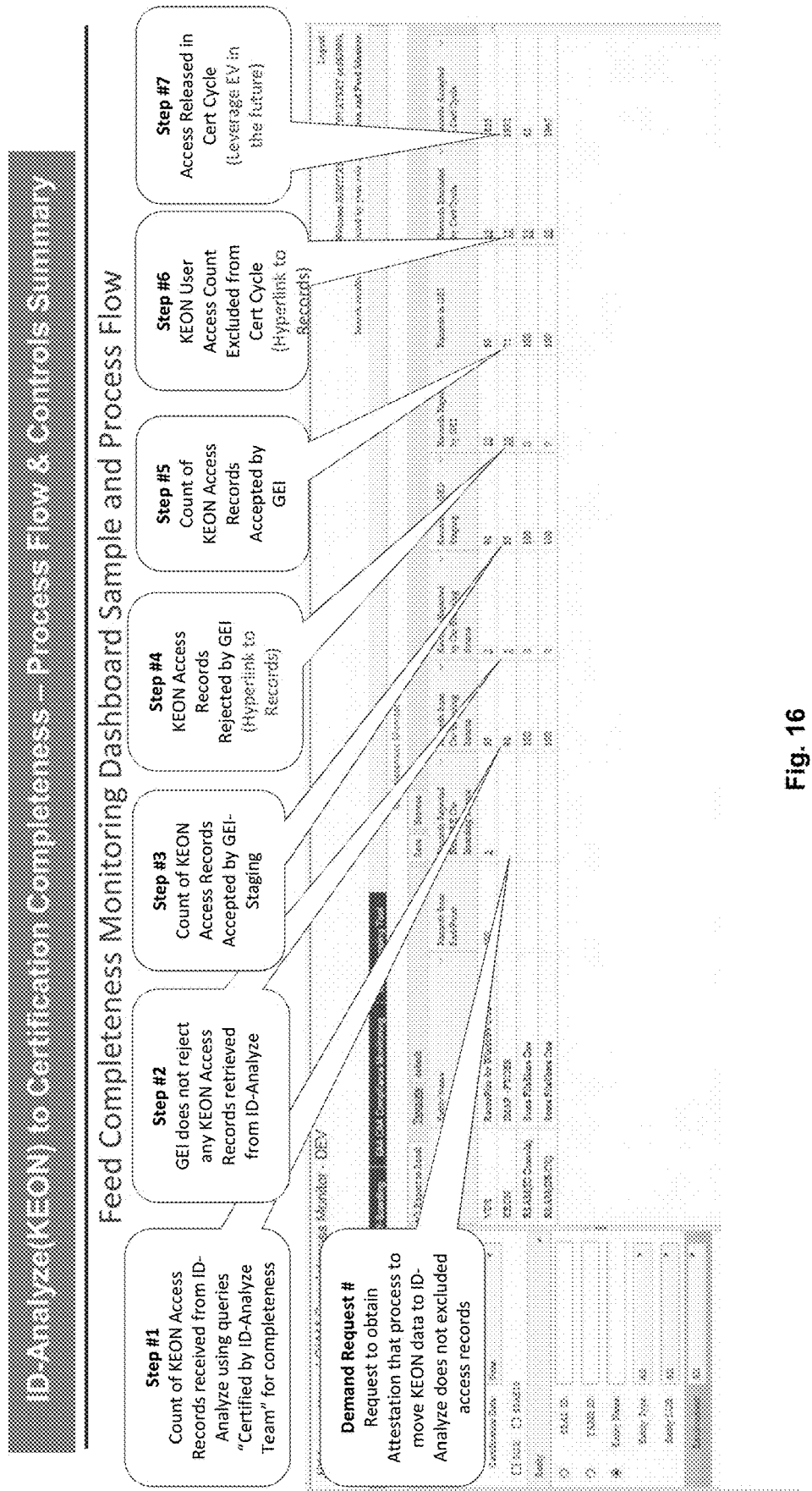
Figure 17:
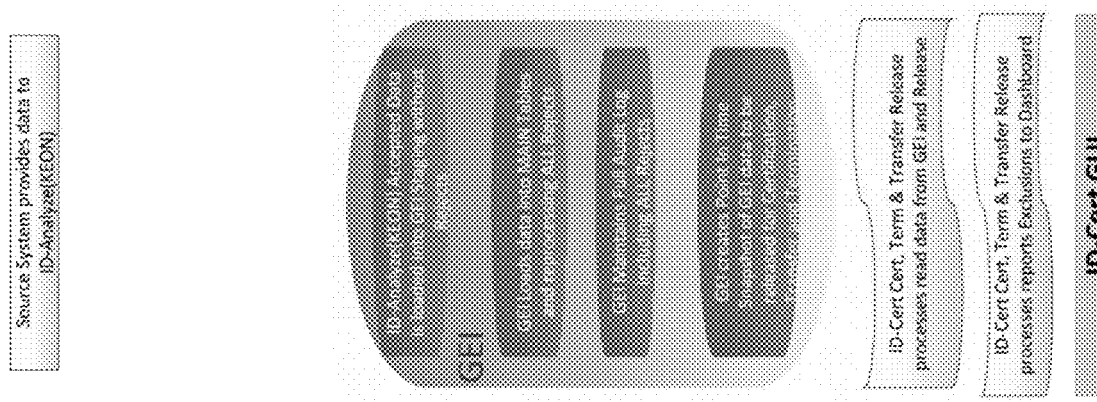
Figure 18:
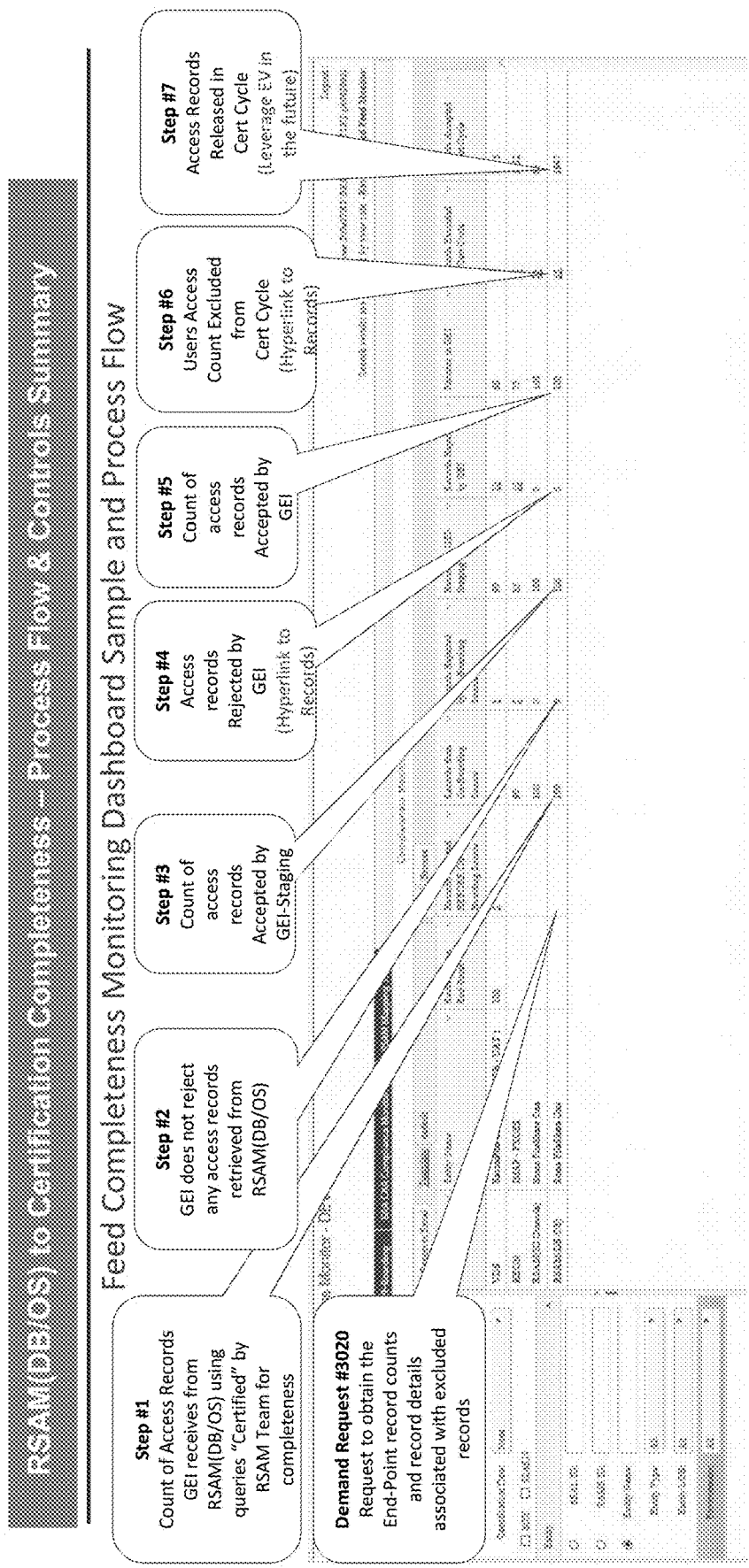
Figure 19:
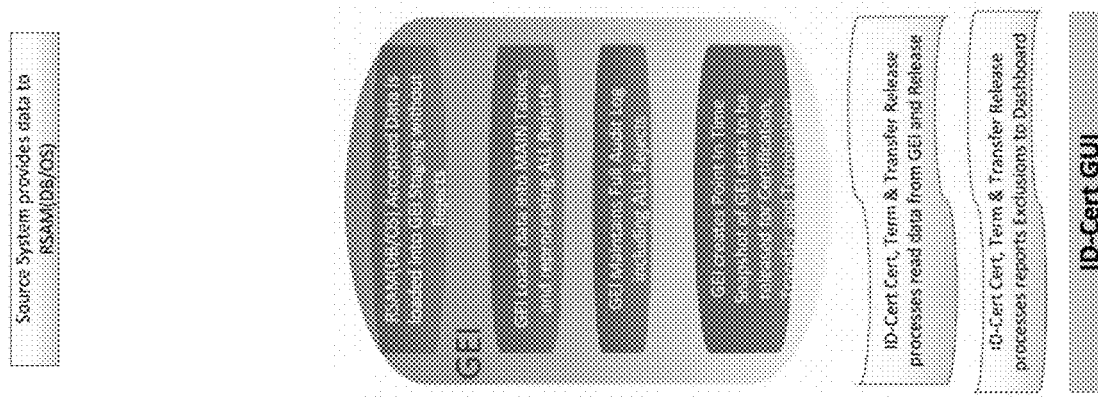
Figure 20:
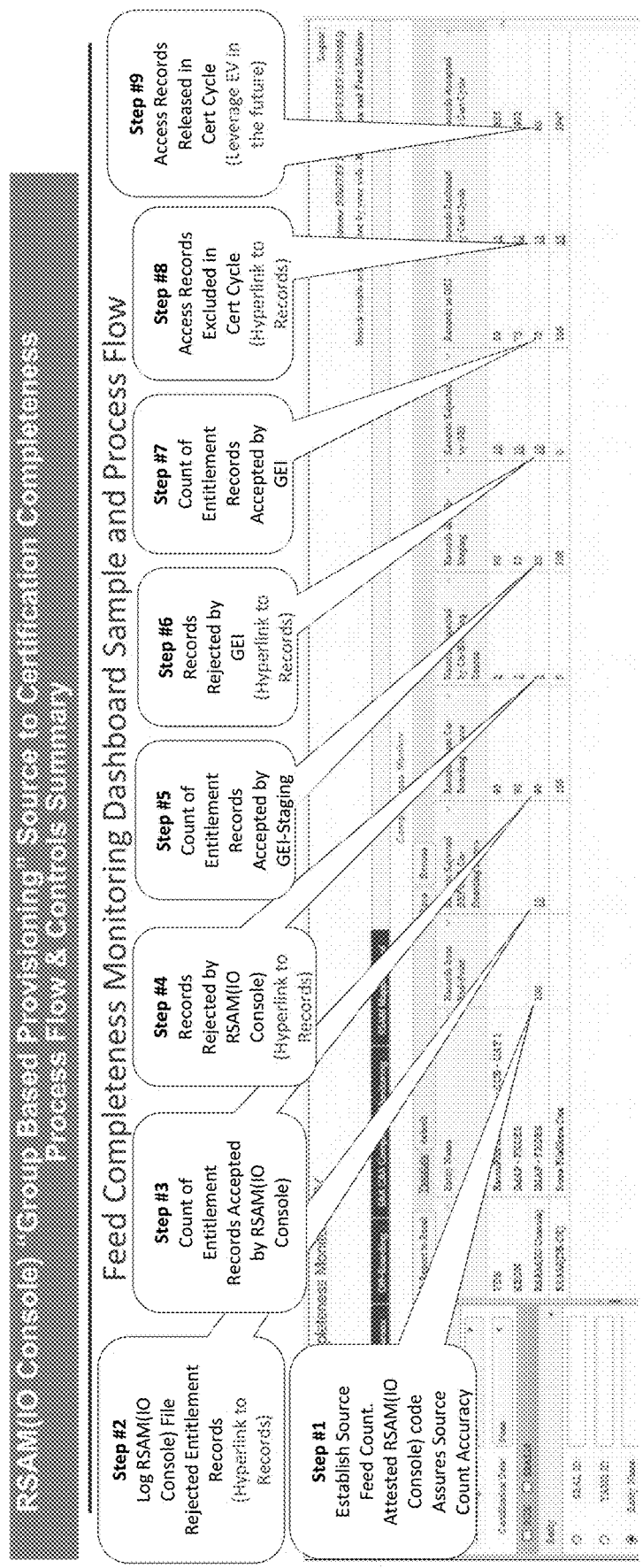
Figure 21:
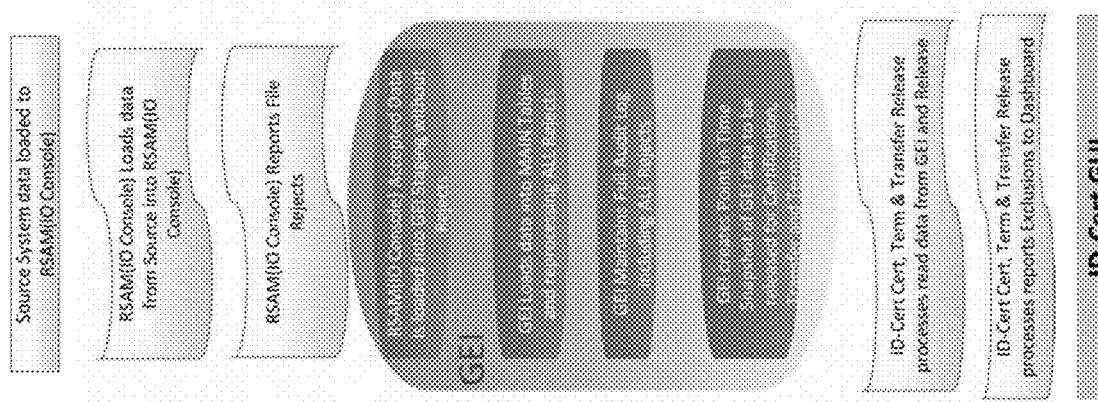
Figure 22:
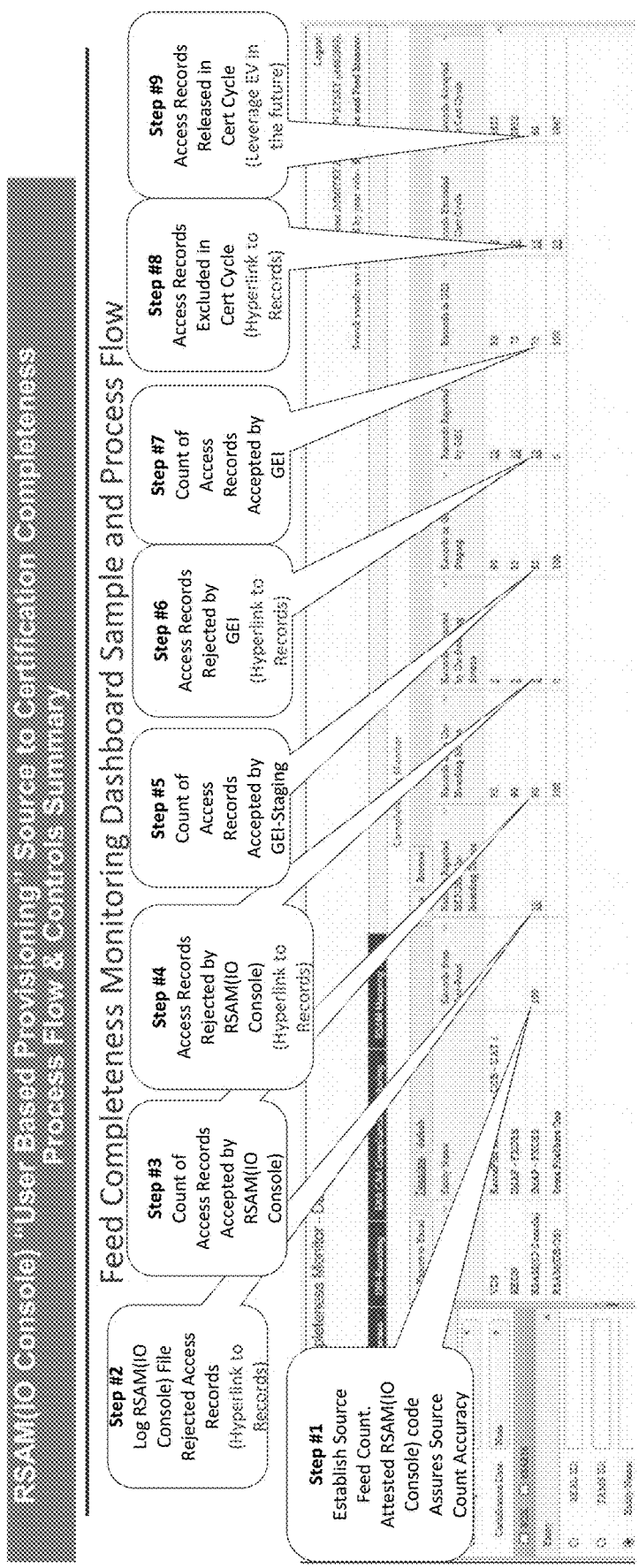
Figure 23:
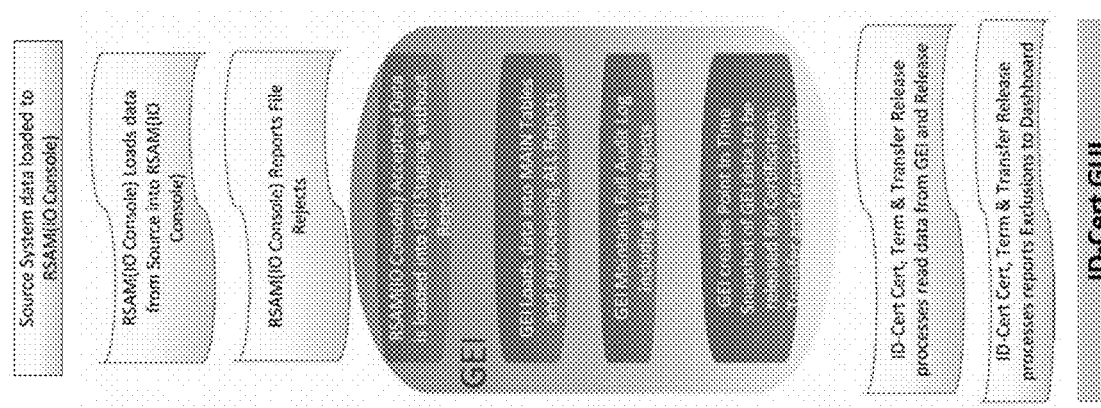
Figure 24:
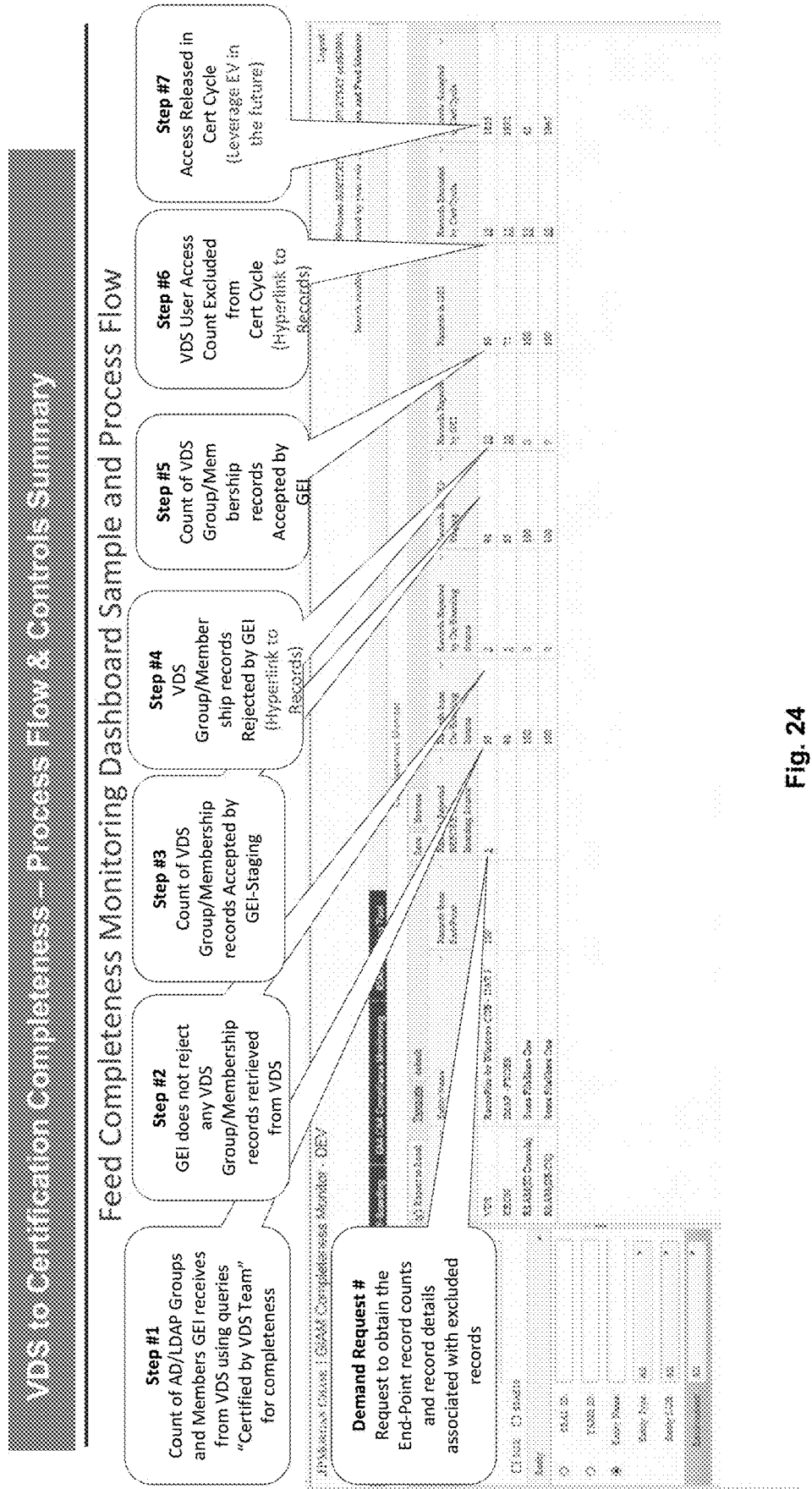
Figure 25:
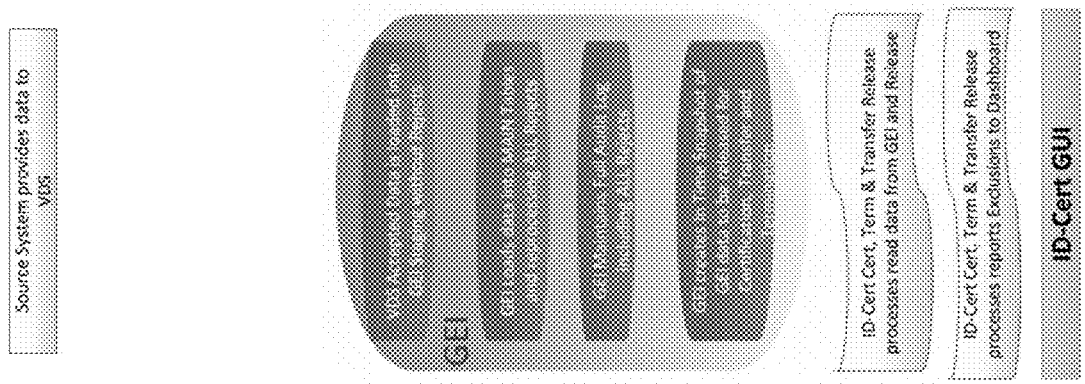

FIGS. 6 and 7 illustrate exemplary embodiments specific to a particular GIAM 100 and first data 202 type. Other exemplary embodiments are illustrated in FIGS. 8-25. These figures represent further exemplary embodiments of the disclosure and are practiced in a manner similar to those of FIGS. 6 and 7. For example, FIGS. 8 and 9 are representative of a GIAM implementation with source files from a DCR source. FIGS. 10 and 11 are representative of a GIAM implementation with source files from a fileshare (e.g. DO FileShares). It will be noted in certain figures (for example, FIGS. 10 and 11), certain systems involve first data 202 that is provided by a source that certifies the first data 202 such that there are not rejected records. FIGS. 12 and 13 are representative of a GIAM implementation with source files from an enterprise password vault (EPV) source. FIGS. 14 and 15 are representative of a GIAM implementation with source files from an ID-Integrate source. FIGS. 16 and 17 are representative of a GIAM implementation with source files from an ID-Analyze(KEON) source. FIGS. 18 and 19 are representative of a GIAM implementation with source files from an RSAM(DB/OS) source. FIGS. 20 and 21 are representative of a GIAM implementation with source files from an RSAM(IO Console) source. Specifically, FIGS. 20 and 21 illustrate and exemplary process flow and controls summary for "group based provisioning" of the RSAM(IO Console) source. FIGS. 22 and 23 are representative of a GIAM implementation with source files also from an RSAM (IO Console) source. Specifically, FIGS. 22 and 23 illustrate and exemplary process flow and controls summary for "user based provisioning" of the RSAM(IO Console) source. FIGS. 24 and 25 are representative of a GIAM implementation with source files from an VDS source. It will be appreciated that the various sources and implementations described above may vary and are offered for illustrative purposes only.

While the present disclosure and associated concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the present disclosure, in its broader aspects, is not limited to the specific details, the representative apparatus, and illustrative examples shown and described. Accordingly, departures may be made from such details without departing from the spirit or scope of the disclosed general concepts.

What is claimed is:

1. A system for confirming compliance, the system comprising:
   a plurality of servers, comprising at least a first, second, and third server;
   a display;
   software instructions that, when executed by a processor and a memory at one of the plurality of servers:
   cause the first server to:
      obtain first data, said first data defining access entitlements of a first user to a first system;
      obtain second data, said second data defining access entitlements of a second user to the first system;
      obtain third data, said third data defining access entitlements of the first user to a second system;
      obtain fourth data, said fourth data defining access entitlements of the second user to the second system;
   cause the second server to:
      obtain fifth data from the third server, the fifth data relating to a status of a third user of a third system, wherein the third user is one of the first user or the second user, and
         wherein the third system is one of the first system or the second system;
      determine whether a set of access entitlements that is associated with the fifth data matches the access entitlement obtained from the first server that corresponds to the third user for the third system;
      present a result of the determination on the display via a graphical user interface, the user interface including a dashboard; and
      generate a request to modify employee access rights for a system when at least one from among the first data, the second data, the third data, and the fourth data represents entitlements that differ from those contained in the fifth data.

2. The system of claim 1, further comprising a database, wherein the first data, the second data, the third data, and the fourth data are stored in the database.

3. The system of claim 1, wherein the status of the third user is a role within an organization.

4. The system of claim 1, wherein the status of the third user is employed or not employed.

5. The system of claim 1, wherein the obtaining of the first data and the third data further comprises software instructions that cause the first server to collect a data feed from a system resource.

6. The system of claim 1, wherein the obtaining of the first data and the third data further comprises software instructions that cause the first server to extract data from a system resource.

7. The system of claim 1, further comprising software instructions that cause the second server to identify an instance of excluded access in at least one of the first data, the second data, the third data, and the fourth data.

8. The system of claim 7, wherein the software instructions cause the second server to create an access count and a number representing user exclusions identified in at least one of the first data, the second data, the third data, and the fourth data.

9. The system of claim 1, wherein the fifth data comprises employment status and employee role data.

10. The system of claim 9, further comprising software instructions that cause the second server to determine whether employment status data discloses that the employee is no longer employed and also determine whether at least one of the first data, the second data, the third data, and the fourth data reflects access rights that correspond to that unemployed status.

11. The system of claim 1, wherein the software instruction that causes the second server to determine whether the set of access entitlements that is associated with the fifth data matches the access entitlement obtained from the first server that corresponds to the third user for the third system further comprising instructions that causes the second server to identify access rights according to the employee's role and compare those rights to the rights for that employee found in at least one of the first data, the second data, the third data, and the fourth data.

12. The system of claim 1, wherein there are at least 500 users.

13. A method for confirming compliance, the method comprising:

obtaining, by a first server, first data, said first data defining access entitlements of a first user to a first system;

obtaining, by the first server, second data defining access entitlements of a second user to the first system;

obtaining, by the first server, third data defining access entitlements of the first user to a second system;

obtaining, by the first server, fourth data defining access entitlements of the second user to the second system;

obtaining, by a second server, fifth data from a third server, the fifth data relating to a status of a third user of a third system, wherein the third user is one of the first user and the second user, and the third system is one of the first system and the second systems;

determining, by the second server, whether a set of access entitlements that is associated with the fifth data matches the access entitlement obtained from the first server that corresponds to the third user for the third system;

displaying, by the second server via a display, a result of the determination; and generating, by the second server, a request to modify employee access rights for a system when at least one from among the first data, the second data, the third data, and the fourth data represents entitlements that differ from those contained in the fifth data.

14. The method of claim 13, further comprising the steps of:

identifying third user access entitlements which do not match entitlements associated with the fifth data;

generating a request to modify entitlements for those identified third user access entitlements;

monitoring at least one of the first data, the second data, the third data, and the fourth data to ensure that modified entitlements comply with a standard associated with an access type;

identifying incorrect or missed access modifications; and resolving the incorrect or missed modifications by informing an application owner that the modification is incorrect or missing.

15. The method of claim 13, further comprising collecting the first data from a data feed from the first system.

16. The method of claim 13, further comprising extracting the first data from the first system.

17. The method of claim 13, wherein determining whether the set of access entitlements that is associated with the fifth data matches the access entitlement obtained from the first server that corresponds to the third user for the third system further comprises identifying an instance of excluded access in at least one of the first data, the second data, the third data, and the fourth data.

18. The method of claim 13, wherein the fifth data comprises employment status and employee role data for an employee.

19. The method of claim 13, further comprising determining whether the fifth data discloses that the employee is no longer employed, and determining whether at least one of the first data, the second data, the third data, and the fourth data comprises access rights that correspond to the unemployed status.

20. A system for confirming compliance, the system comprising:

a first server;

a second server;

a third server; and a display;

software instructions that, when executed:

cause the first server to:

obtain first data, said first data defining access entitlements of a first user to a first system;

obtain second data, said second data defining access entitlements of a second user to the first system;

obtain third data, said third data defining access entitlements of the first user to a second system;

obtain fourth data, said fourth data defining access entitlements of the second user to the second system;

cause the second server to:

obtain fifth data from the third server, the fifth data relating to a status of a third user of a third system, wherein the third user is one of the first user and the second user, and wherein the third system is one of the first system and the second systems;

determine whether a set of access entitlements that is associated with the fifth data matches the access entitlement obtained from the first server that corresponds to the third user for the third system;

present a result of the determination on the display via a graphical user interface, the user interface including a dashboard;

generate a request to modify employee access rights for a system when at least one of the first data, the second data, the third data, and the fourth data represents entitlements that differ from those contained in the fifth data;

determine the period of noncompliance time during which the entitlements contained in at least one of the first data, the second data, the third data, and the fourth data differed from those entitlements in the fifth data;

receive regulatory rules and compliance requirement data from a regulatory rules and compliance requirements server and compare the requirement data to the period of noncompliance time to determine whether the regulatory rules and compliance requirements remain satisfied; and create a notification that represents a summary of regulatory rules and compliance requirements that are not in compliance.

* * * * *